Figure 1:
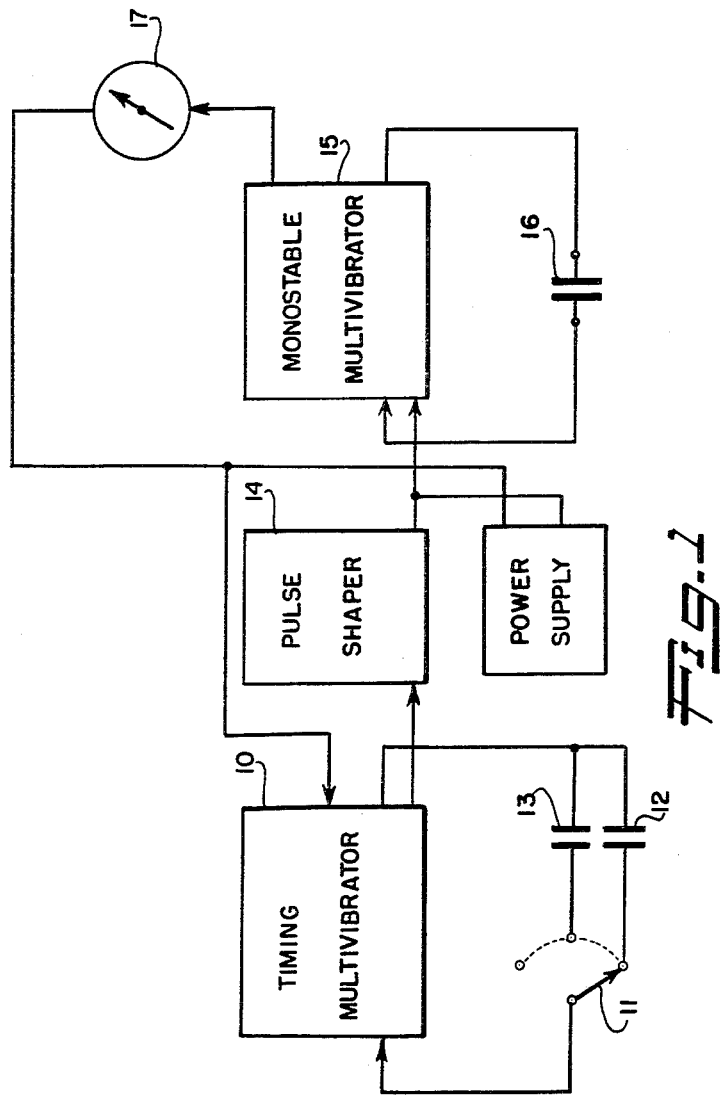

June 7, 1960  E. N. LIDE  2,940,037
CAPACITANCE METER

Filed Dec. 16, 1957  2 Sheets-Sheet 1

INVENTOR.
EDWARD N. LIDE
BY
George C. Sullivan
Agent

June 7, 1960  E. N. LIDE  2,940,037
CAPACITANCE METER

Filed Dec. 16, 1957  2 Sheets-Sheet 2

INVENTOR.
EDWARD N. LIDE
BY
*George C. Sullivan*
Agent

United States Patent Office

2,940,037
Patented June 7, 1960

2,940,037

CAPACITANCE METER

Edward N. Lide, Chamblee, Ga., assignor to Lockheed Aircraft Corporation, Burbank, Calif.

Filed Dec. 16, 1957, Ser. No. 702,962

5 Claims. (Cl. 324—60)

This invention relates to devices for testing capacitors to determine the capacitance and/or the efficiency thereof.

In the past, various devices have been proposed for testing the quality of capacitors, principally for determining the capacitance thereof. Various forms of bridge type testing devices have been employed, usually in the form of a Wheatstone bridge, and such devices operate on the principle of comparison or balance of capacitances. Such devices are costly and they are also subject to change of values of the elements in the bridge circuit per se. Other devices have been proposed which operate by measurement of charging or discharging current, but such devices have been objectional for one reason or another and as far as is known they have never gone into commercial use. Furthermore, difficulties have been encountered when employing conventional bridge networks which stem largely from the fact that daily calibration is required and special procedures must be followed in operating the bridge network which requires technical skill and training.

Accordingly, the present invention provides a novel electrical circuit for measuring the capacitance for an unknown capacitor which is a portable direct reading device. In the system according to this invention, a "free running" multivibrator is employed which generates a wave-form having a predetermined time constant. This generated signal is differentiated by a pulse shaping circuit and then applied to trigger a monostable multivibrator having a micro-ammeter placed in the circuit of the normally "off" side thereof. The monostable multivibrator has a quasi-stable state determined by an unknown capacitor undergoing test and for a fixed driving frequency, the average value of current through the meter is determined by the duration of the quasi-stable state of the monostable multivibrator. Since the duration of the state is directly proportional to capacitance value, the meter deflection is a linear function of capacitance of the capacitor undergoing test. A feature resides in the fact that the circuit of the present invention employs solid state semi-conducting devices such as transistors so that low voltages and low current drain can be realized. Therefore it is an object of the present invention to provide a simple and inexpensive system which will give accurate and direct indication of capacitance of a capacitor being tested.

It is another object of the present invention to provide a portable direct reading capacitance meter which employs semi-conductor elements which require low voltage drain and allows the main voltage to remain essentially constant.

Still a further object of the present invention is to provide a portable device capable of direct reading of capacitance without the necessity of balancing or other adjustments.

Another object of the present invention is to provide a direct reading capacitance meter which employs a self-contained voltage power supply not in excess of 3 volts.

Figure 2:
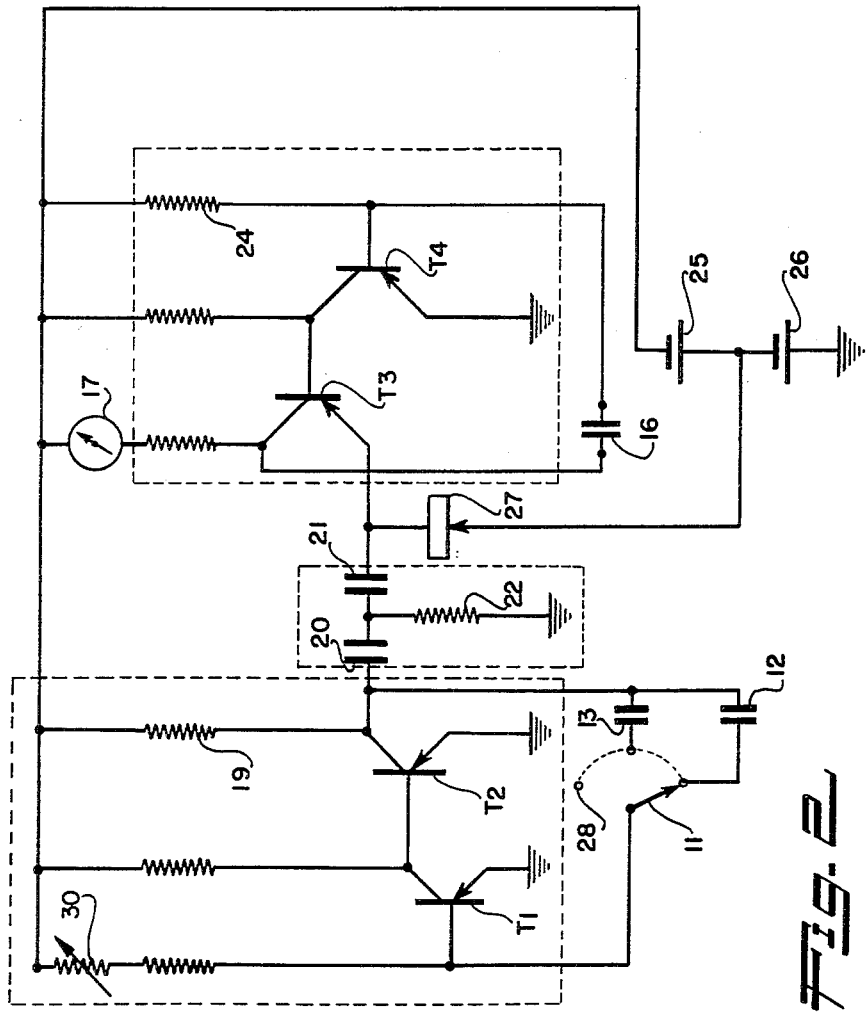

These and other objects will be seen more clearly in the following figures and description in which:

Figure 1 is a block diagram of the capacitance meter of the present invention; and Figure 2 is a circuit diagram of the block diagram shown in Figure 1.

With reference to Figure 1, block 10 comprising, in general, a timing multivibrator which may be considered of the "free running" type wherein the time constant is determined by the selection of a timing capacitor selected by a range selector switch 11. In the present instance, a pair of timing capacitors 12 and 13 is provided. The output of the multivibrator is differentiated by a pulse-shaping circuit 14 and is employed to trigger a monostable multivibrator 15 which has the characteristic of a quasi-stable state. A capacitor 16, which may be considered an external capacitor of unknown value undergoing test, determines the duration of the quasi-stable state and, hence, determines the average value of current supplied to a meter 17 for a given fixed driving frequency as supplied by the timing multivibrator. Since the duration of this state is directly proportional to capacitance value, the meter 17 deflection is a linear function of capacitance.

Inasmuch as the capacitor 16, undergoing test, determines the duration of the quasi-stable state of the monostable multivibrator and the value of the range determining capacitor 12 determines the driving frequency, it can be readily seen that by properly choosing the range determining capacitor, the micro-ammeter may be made to deflect full-scale for any desired value of externally added capacitance. For example, a 100 micro-ammeter meter deflects full-scale for external capacitors of .01 or .1 micro-farads depending upon the position of the range selector switch in the present instance.

Referring to the detailed circuit diagram on Figure 2, the basic "free running" multivibrator circuit is simply a double stage RC coupled amplifier with the output of the second stage coupled through the range selector switch and capacitor 12 to the input of the first stage. The multivibrator circuit may be said to consist, essentially, of a pair of grounded emitter amplifier stages employing a pair of semi-conductors, such as transistors T1 and T2 and a resistance-capacitance network including capacitor 12 and load resistor 19 coupling the output circuit of transistor T2 and the inut circuit of transistor T1. It has been found preferable to employ a grounded emitter circuit since this circuit offers a large current amplification and a definite power gain as compared with grounded collector or base circuits. Also, it has been found preferable to employ junction type transistors in the present instance.

The timing multivibrator is employed to generate a driving frequency which activates the monostable multivibrator "on and off" at a predetermined rate.

The pulse-shaping circuit comprises a pair of capacitors 20 and 21 connected in parallel to ground via a resistor 22. This RC differentiator circuit produces an output voltage having an amplitude which is proportional to the rate of change of the input voltage from the timing multivibrator. Because a square wave output from the timing multivibrator has a fast rise and fall in voltage, it may be applied to the input of the RC pulse-shaping network to produce sharp voltage spikes across the output of the shaper. These spikes are used to trigger the monostable multivibrator.

The monostable multivibrator circuit consists primarily of a pair of transistors T3 and T4 representing essentially a two-stage resistance capacitance coupled amplifier with one transistor normally cut off and the other normally conducting. The balance condition of the circuit is established by the arrangement for biasing the transistors by means of the resistance and capacitance network including a capacitor 16 and a resistor 24. The capacitance in the present invention is capacitor 16 undergoing test having an unknown value.

A micro-ammeter 17 is coupled in the collector circuit of the normally "off" transistor T3 and is preferably capable of reading within a range of 0–100 micro-ammeters. A pair of 1.30 volt batteries 25 and 26 are connected in parallel with a rectifier 27 to provide a source of voltage and current for operation of the circuits. A contact 28 of switch 11 is provided for decoupling the power supply from the circuit and, therefore, serves as a convenient "on-off" switch.

Potentiometer 30 may be employed to accomplish initial calibration of the invention which will be adjusted when a standard capacitor of known value is employed as capacitor 16.

In actual operation, an unknown capacitor 16 is placed in the monstable multivibrator circuit 15 and switch 11 is positioned to place a range capacitor, such as capacitor 12, in the timing multivibrator circuit 10. This action supplies the necessary voltage and current from batteries 25 and 26 to operate the circuits.

The output from the timing circuit 10 is impressed upon the shaping circuit 14 which differentiates the output and applies a trigger pulse to the monostable multivibrator 15. Capacitor 16 determines the duration of one state of the multivibrator. Hence, for a fixed driving or triggering frequency from the pulse-shaper circuit 14, the average value of current will flow through the meter 17.

Since the duration of this state is directly proportional to capacitance value, the meter 17 deflection is a linear function of the unknown capacitance of capacitor 16. Hence, by the proper choice of the range determining capacitor 12 or 13, the meter 17 may be made to deflect full scale for any desired value of capacitor 16.

While I have described my invention and the present preferred embodiment thereof, I desire to emphasize the fact that many modifications may be resorted to in a manner limited only by a just interpretation of the following claims.

I claim:

1. In a system for testing the unkown capacitance of a capacitor, a timing multivibrator circuit for generating a series of pulses at a predetermined frequency, a plurality of capacitors selectively connected in the last mentioned circuit for determining the pulse frequency, a pulse differentiating circuit coupled to the output of the timing multivibrator circuit for receiving the series of pulses and shaping each pulse, a monostable multivibrator circuit coupled to the pulse differentiating circuit including a capacitor of unknown value operated by the shaped pulses to determine the length of monostable operation, and a current metering device coupled to the output of the monostable multivibrator having a metered deflection which is a linear function of the unknown capacitance in the last mentioned circuit.

2. In a portable system for testing the unknown capacitance of a capacitor, a timing multivibrator transistor circuit including a capacitance of known value for determining an output pulse frequency, a pulse shaping network connected to the output of the timing multivibrator for differentiating the output pulse of the timing multivibrator circuit, a monostable multivibrator transistor circuit coupled to the output of the pulse shaping network including the capacitor of unknown value which determines the length of monostable operation, a power supply coupled to the monostable multivibrator circuit and the input of the timing multivibrator circuit for placing a biasing operating current on the circuits, and a current meter coupled to the output of the monostable multivibrator circuit having a meter deflection which is a linear function of the unknown capacitor and the length of monostable operation.

3. In a system for testing the unknown capacitance of a capacitor, a timing multivibrator transistor circuit including a capacitance of known value for generating a series of pulses at a predetermined frequency, a pulse shaping network connected to the output of the timing multivibrator for differentiating the series of pulses from the timing multivibrator circuit, a monostable multivibrator transistor circuit coupled to the pulse shaping circuit including the capacitor of unknown value which is activated by the series of pulses shaped by the pulse shaping circuit to determine the length of monostable operation, a power supply coupled to the monostable multivibrator circuit and the timing multivibrator circuit for placing an operating biasing current on the circuits, and a current meter coupled to the monostable multivibrator circuit having a meter deflection which is a linear function of the unknown capacitor as determined by the length of monostable operation.

4. In a system for testing a capacitor of unknown value, a timing multivibrator circuit including a pair of solid state semi-conducting devices coupled together by a capacitor of known value for generating a series of pulses at a predetermined frequency, a pulse shaping network coupled to the timing multivibrator circuit including a resistance and at least one capacitor and responsive to the series of pulses whereby the series of pulses are differentiated to provide a series of trigger pulses, a monostable multivibrator circuit including a pair of solid state semi-conducting devices having alternate conditions of electrical current conduction, the last mentioned circuit including the capacitor of unknown value coupled between the pair of semi-conducting devices to control the conductive condition of the semi-conducting devices, and a current meter coupled to one of the semi-conducting devices of the monostable multivibrator circuit having a meter deflection which is a linear function of the capacitor of unknown value.

5. In a test system having a capacitor of unknown value, an electrical transistor generator circuit means for producing a series of signal pulses at a given frequency, a pulse shaping network for receiving the series of pulses from the generator circuit means for differentiating each pulse of the series, a monostable transistor multivibrator having a normally non-conducting stage and a normally conducting stage of operation, circuit means coupling the pulse shaping network to the monostable multivibrator so that the differentiated signal pulses are supplied to the normally non-conducting stage, the capacitor of unknown value included in the monostable multivibrator coupled between the normally non-conducting and conducting stage, and a current meter coupled to the normally non-conducting stage of the monostable multivibrator having a meter deflection which is a linear function of the unknown capacitor.

References Cited in the file of this patent

UNITED STATES PATENTS

| | | |
|---|---|---|
| 2,492,617 | Boland et al. | Dec. 27, 1949 |
| 2,601,491 | Baker | June 24, 1952 |
| 2,668,943 | Wilson | Feb. 9, 1954 |